US009704276B1

(12) United States Patent
Wilson

(10) Patent No.: US 9,704,276 B1
(45) Date of Patent: Jul. 11, 2017

(54) ENHANCEMENT AND DISPLAY METHODS FOR INTUITIVELY READ THREE-DIMENSIONAL VISUAL REPRESENTATIONS OF DIGITAL AUDIO FILES

(71) Applicant: Randall Charles Wilson, Pacifica, CA (US)

(72) Inventor: Randall Charles Wilson, Pacifica, CA (US)

(73) Assignee: Randall C. Wilson, Pacifica, CA (US)

( * ) Notice: Subject to any disclaimer, the term of this patent is extended or adjusted under 35 U.S.C. 154(b) by 20 days.

(21) Appl. No.: 14/451,811

(22) Filed: Aug. 5, 2014

(51) Int. Cl.
  *G06T 17/00* (2006.01)
  *G06T 11/20* (2006.01)
  *G10L 19/02* (2013.01)
  *G06F 3/0484* (2013.01)

(52) U.S. Cl.
  CPC ............ *G06T 11/206* (2013.01); *G06T 17/00* (2013.01); *G10L 19/02* (2013.01); *G06F 3/04847* (2013.01); *G06F 2203/04802* (2013.01); *G06T 2207/20108* (2013.01)

(58) Field of Classification Search
  USPC ......................................................... 345/419
  See application file for complete search history.

(56) References Cited

U.S. PATENT DOCUMENTS

| 8,872,850 B2* | 10/2014 | Joshi | G11B 27/031 345/629 |
| 9,053,562 B1* | 6/2015 | Rabin | G06T 19/00 |
| 9,185,361 B2* | 11/2015 | Curry | H04N 5/222 |
| 2011/0098056 A1* | 4/2011 | Rhoads | G01C 21/20 455/456.1 |
| 2013/0222371 A1* | 8/2013 | Reitan | G06T 19/006 345/419 |

* cited by examiner

*Primary Examiner* — Kimbinh T Nguyen

(57) ABSTRACT

The proposed method creates a detailed, accurate, frequency and amplitude-based three-dimensional moving display of digital audio files. It adds timestamps, used later in the process to achieve accurate synchronization between a moving display and playback of the analyzed audio file. It details how the analyzed data is processed and enhanced to prominently show the most fundamental elements in the audio file. The method proposes different layouts for displays and ways of showing separate elements of the audio simultaneously. Upcoming audio is displayed in locations that allow viewers to anticipate and react to events about to happen. It introduces the temporal plane of playback for clearly showing the part of the moving display that corresponds to the exact part of the analyzed audio that is playing. The temporal plane of playback demonstrates the direct correlation with the audio and accurate synchronization between sound and picture.

16 Claims, 7 Drawing Sheets

Figure 1:
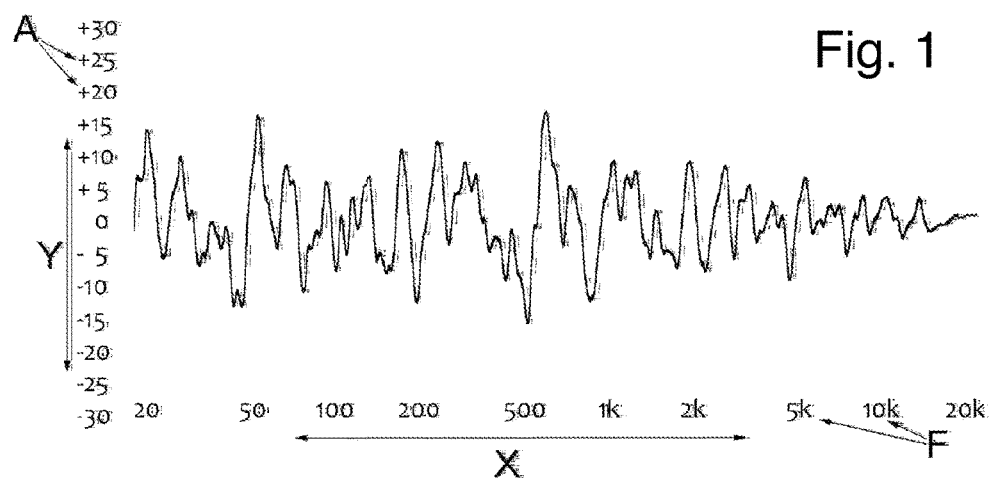

ENHANCEMENT AND DISPLAY METHODS FOR INTUITIVELY READ THREE-DIMENSIONAL VISUAL REPRESENTATIONS OF DIGITAL AUDIO FILES

RELATED APPLICATIONS

This application claims priority from U.S. Provisional Application No. 61/864,61 entitled "Three-Dimensional Visual Representation of Digital Audio Files" filed on 11 Aug. 2013 and incorporated herein in its entirety.

FIELD OF THE INVENTION

This invention relates generally to visual representations of digital audio files, and more specifically to three-dimensional visual representations of such files that include visual enhancement functions to audio spectra as well as an intuitive method of displaying and indicating the point of playback in the visual representation.

Introduces a number of unique techniques that used in combination produce an intuitively read 3D visual display that moves tightly synchronized with the analyzed audio. This visual display of frequency, amplitude, and time-based audio data is stored in computer memory or other digital media.

By adding a temporal plane of playback the display shows the exact temporal aspect within the time domain of the audio being played in sync with the display as well as an accurate display of the fundamental notes and additionally the overtones if desired.

BACKGROUND

Visual displays of sound and music have several limitations that have hindered their widespread adoption for practical application in the fields of entertainment, education, art, and general sound analysis. These displays are difficult to interpret because they do not adequately illustrate the important fundamentals obscured within the audio, whether musical notes or a spoken voice in the surrounding visual noise. Prior three-dimensional displays show extreme visual clutter caused by overtones, inharmonics, or noise that obscure the fundamental elements in the audio.

The generated images do not produce a detailed, intuitively interpreted picture of the fundamental parts. Attempts to show the entire, unmodified frequency analysis in three dimensions produce an extremely cluttered scene, packed with thousands of three-dimensional "spikes" or other visual noise that obscure fundamental frequencies. In posted online examples, a punk-rock song by Iggy Pop looks very similar to a Gustav Mahler symphony, though the sonic content of these examples is vastly different. Prior art has not overcome the problems of visual clutter and noise obscuring the most important elements of the displayed audio.

Current video displays created from audio rarely move correctly synchronized to the audio they are supposed to portray or don't show a direct correlation with the music at all. These displays often use slow, flowing motions like waterfalls or fireworks to minimize how poorly the display synchronizes to the audio. Our senses immediately tell us when moving images are out of sync to sound. Prior art does not show a clear correlation between the moving display and audio playback or accurate synchronization between the sound and picture.

OBJECTS AND ADVANTAGES OF THE INVENTION

To present an accurate three-dimensional visual analysis of music and other audio moving in correct synchronization to the analyzed audio recording and to commit this display to digital memory.

In view of the shortcomings of the prior art, it is an object of the present invention to clearly show the fundamental frequencies and other important elements of the analyzed audio in an intuitive, moving three-dimensional display, playing synchronized with the analyzed audio. In music, the fundamental frequencies are the portions of the audio we perceive as the musical notes. When applied to non-musical audio it is the object of the current invention to display important elements in a recording when obscured by other noise. Additionally, if needed, the current invention can show the full frequency spectrum of the audio, or a combination of fundamental frequencies for some sounds and the full frequency spectrum for others. The equivalent of visual noise in three-dimensional displays must be modified to reveal the more significant frequencies it obscures. Modification functions can be performed in the audio or visual domains, or in combinations of these domains.

Important sound elements, separate tracks, instruments, and/or significant sections within a single sound source may be displayed separately, rendered in different colors, textures, lighting/shading or placed on a different plane of the display. This results in much clearer illustrations of the various parts contributing to the overall audio recording.

To show the visual display moving correctly synchronized to the audio, a temporal plane of playback is clearly and prominently shown as a dynamically moving cross section, warp, bulge, or any other method that delineates the temporal spacial location of audio playback across the portion of the audio image that is displayed.

With these modifications, the display becomes useful as a detailed visual map or moving display of the audio file for musicians, audio engineers, students, gamers, recreational observers, or anyone wishing to see, study, or interact with the audio.

These and many other objects and advantages of the invention will become apparent from the ensuing description.

SUMMARY OF THE INVENTION

The objects and advantages of the invention are accrued by the following steps:

A digital audio file is inputted for analysis. This file may optionally be converted to a monophonic sound file to produce a simpler display. The diagrams used in this document are monophonic displays that employ this option.

The audio file is analyzed using standard techniques periodically throughout the file to create temporal frames. Each frame contains a frequency and amplitude-based, two-dimensional graph whose curve represents the frequencies of the audio across the entire spectrum at that point in time. These will be referred to as temporal audio slices. If we use the analogy of the audio file being a loaf of bread, these periodic analyses of the audio resemble bread slices or cross sections across the loaf. However, in an audio analysis, hundreds of thousands of temporal audio slices are created.

A timestamp marking its position in the audio file is added to each temporal audio slice to later ensure playback is correctly synchronized with the audio data each depicts.

Next, visual enhancement functions are applied to said temporal audio slices. Depending on the sound and resulting visual characteristics of the audio file, at least one of many diverse visual enhancement functions are used to maximize the view of the fundamental frequencies and other important sound elements. These visual enhancement functions are essential to creating a more intuitive display of music or nonmusical audio by frequency over time. These techniques may be applied to create both still images of audio as well as the moving video displays discussed in this document.

Following the application of visual enhancement functions, the temporal audio slices are organized along the time axis to generate a three-dimensional representation of the analyzed audio file. A three-dimensional display is created, with earlier audio at the front and later audio in the back.

In moving displays where synchronization with audio playback is required, a Temporal Plane of Playback is added. This temporal plane of playback clearly marks the part of the audio file that is playing back. The temporal plane of playback is clearly shown as a dynamically moving cross section, warp, bulge, line, sharp directional change, or any similar marking method that delineates the current point of sound playback across the entire frequency spectrum for the portion of the analysis that is displayed. With the addition of said temporal plane of playback, the visual display clearly and intuitively moves forward across this delineation in time with the playback of the analyzed audio.

The proposed method can be used with any digital audio including multitrack recordings to display several instruments with different colors, textures, or display instruments on separate planes of playback simultaneously.

The timestamp added early in the analysis process is referenced to ensure correct synchronization between the visual display and playback of the analyzed audio.

The present invention, including the preferred embodiment, will now be described in detail in the below detailed description with reference to the attached drawing figures.

BRIEF DESCRIPTION OF THE DRAWING FIGURES

FIG. 1. Diagrams how two-dimensional temporal audio slices are created by plotting on a graph. Horizontal X axis shows Frequency in Hertz. Vertical Y axis shows Amplitude in Decibels.

Figure 2:
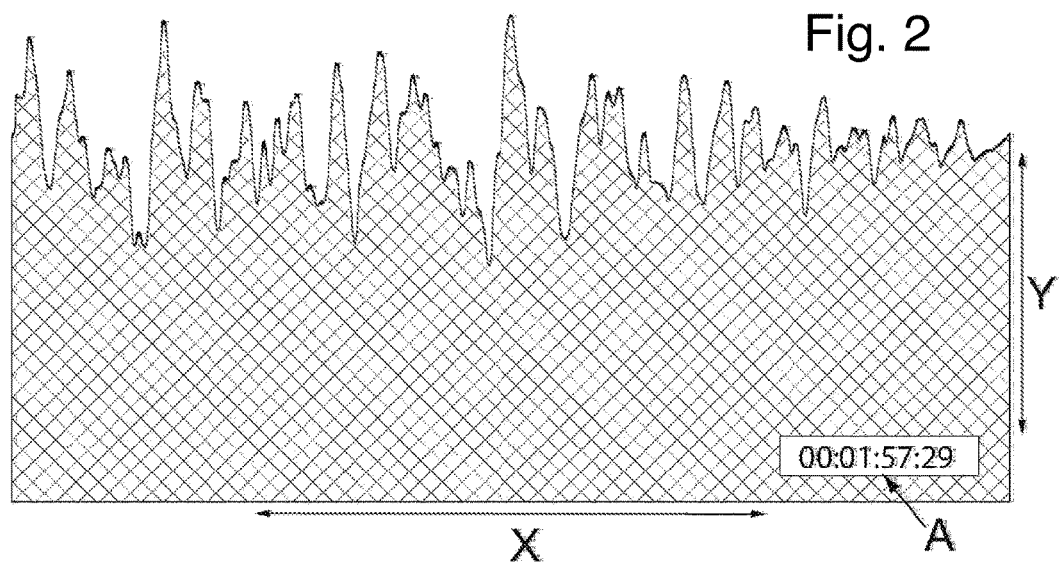

FIG. 2. Is a diagram of a single, unmodified temporal audio slice derived from the method shown in FIG. 1. A Timestamp has been added on the bottom right.

Figure 3:
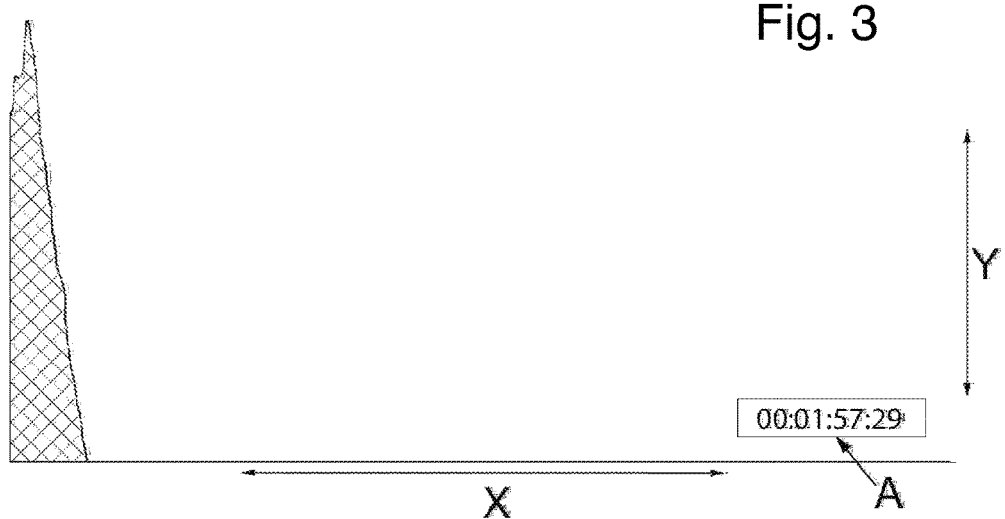

FIG. 3. This diagram shows a Visual Enhancement Function of the original temporal audio slice in FIG. 2. Shows a single Bass Note isolated by removing all upper harmonics and higher fundamentals.

Figure 4:
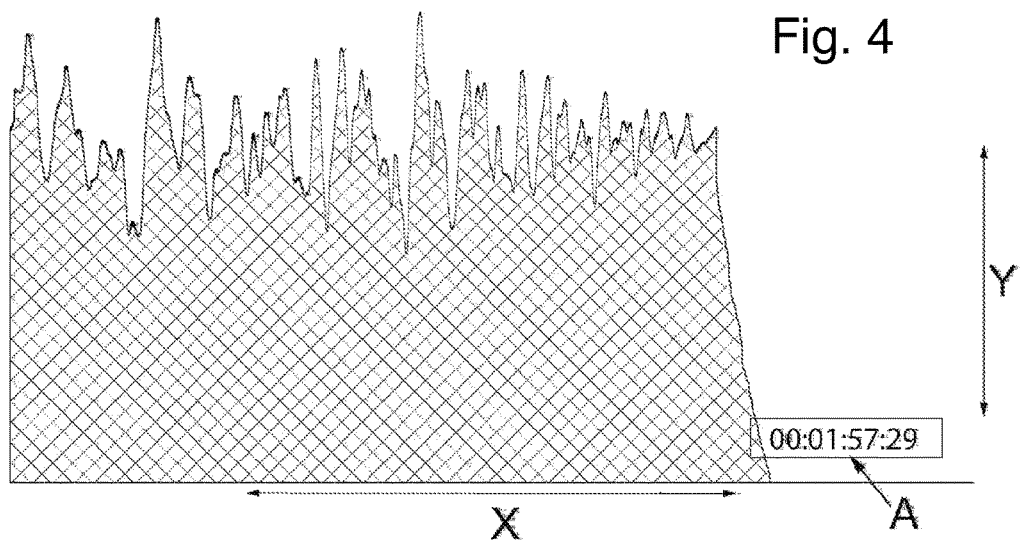

FIG. 4. In this diagram of a different Visual Enhancement Function, the upper harmonics have been visually "skewed," narrowing along the horizontal X axis to focus the viewer on the Fundamental Frequencies used in music notation.

Figure 5:
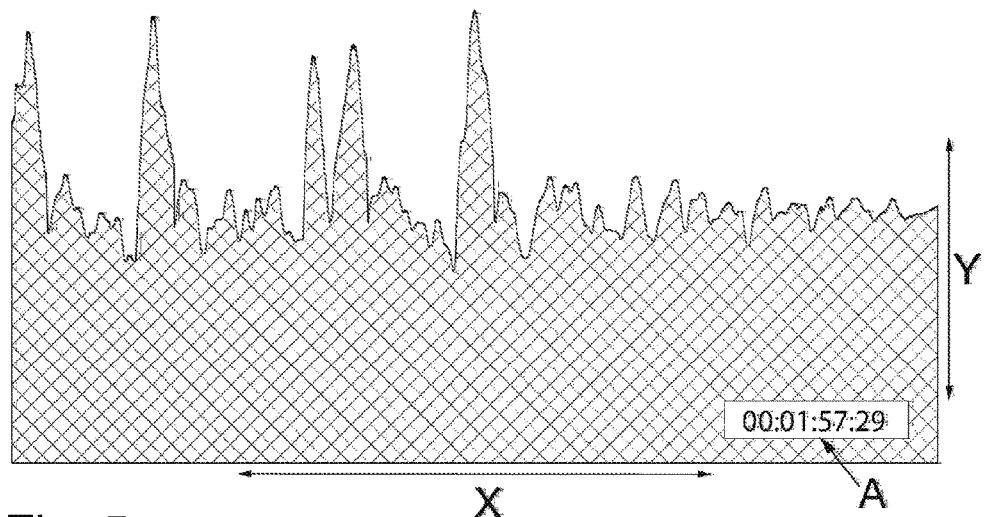

FIG. 5. In this example of a Visual Enhancement Function, the Harmonics have been reduced and Fundamental Frequencies showing musical notes boosted.

Figure 6:
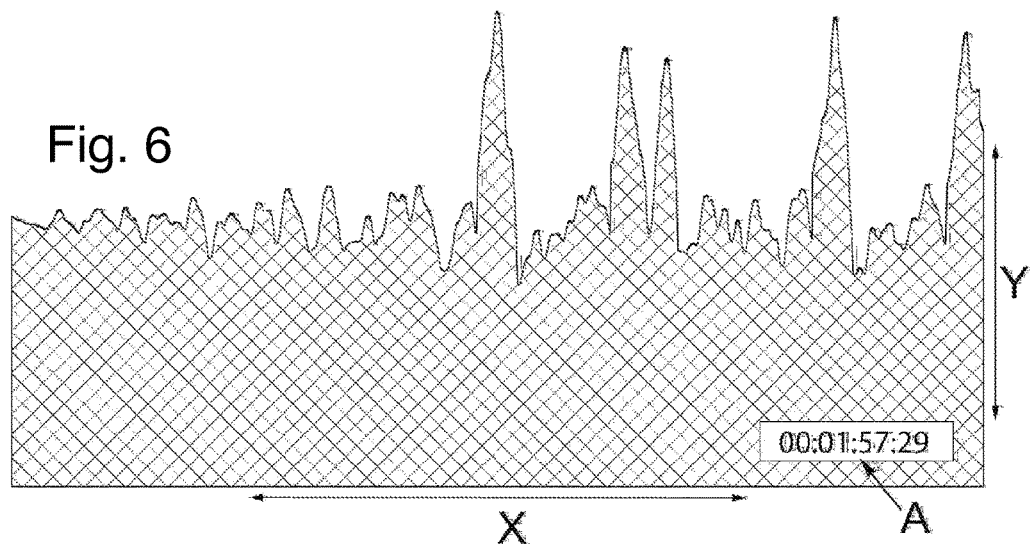

FIG. 6. In this diagram the Visual Enhanced temporal audio slice from FIG. 5 is Horizontally Inverted (Treble on Left, Bass on Right) This modification can be used to show a display similar to music notation when viewed from the correct angle.

Figure 7:
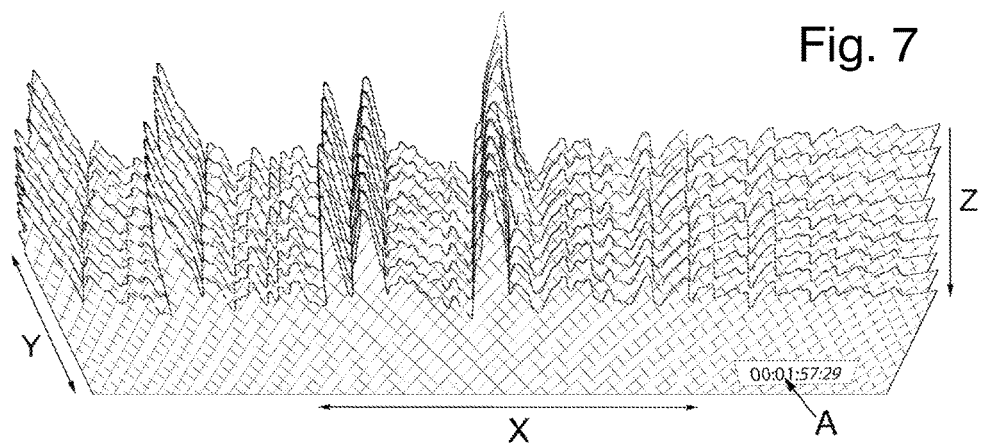

FIG. 7. Nine Visually Enhanced temporal audio slices with timestamps ordered sequentially, stacked along the Z plane to form a contour.

Figure 8:
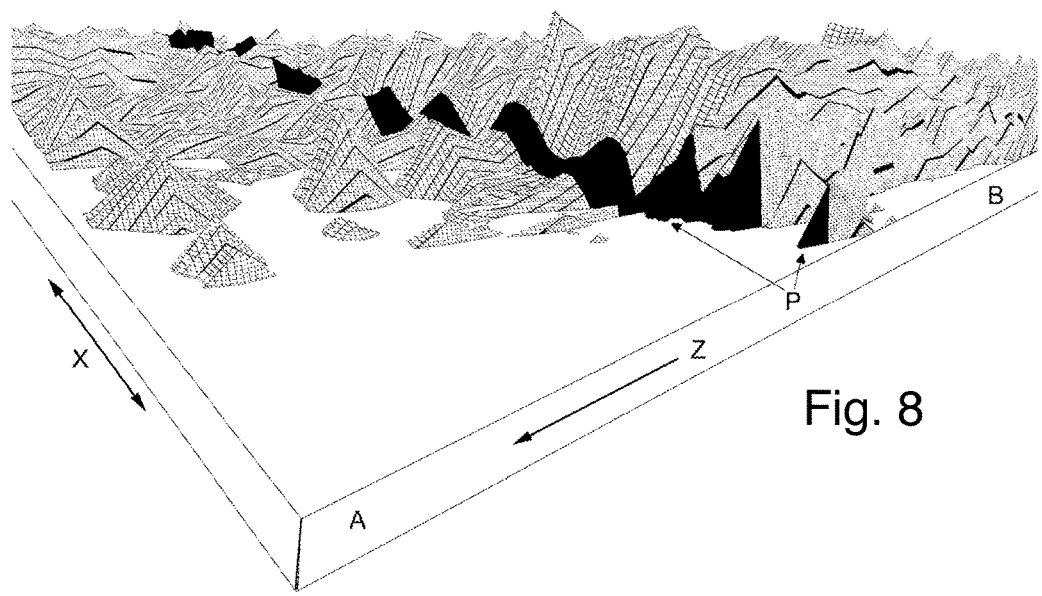

FIG. 8. This wireframe diagram shows the temporal plane of playback as the black contoured area (widened for easier observation). A "slab" below the plane is added only to demonstrate the entire wireframe is moving forward along the Z plane so upcoming audio can be observed and anticipated as it approaches the vertical plane of playback.

Figure 9:
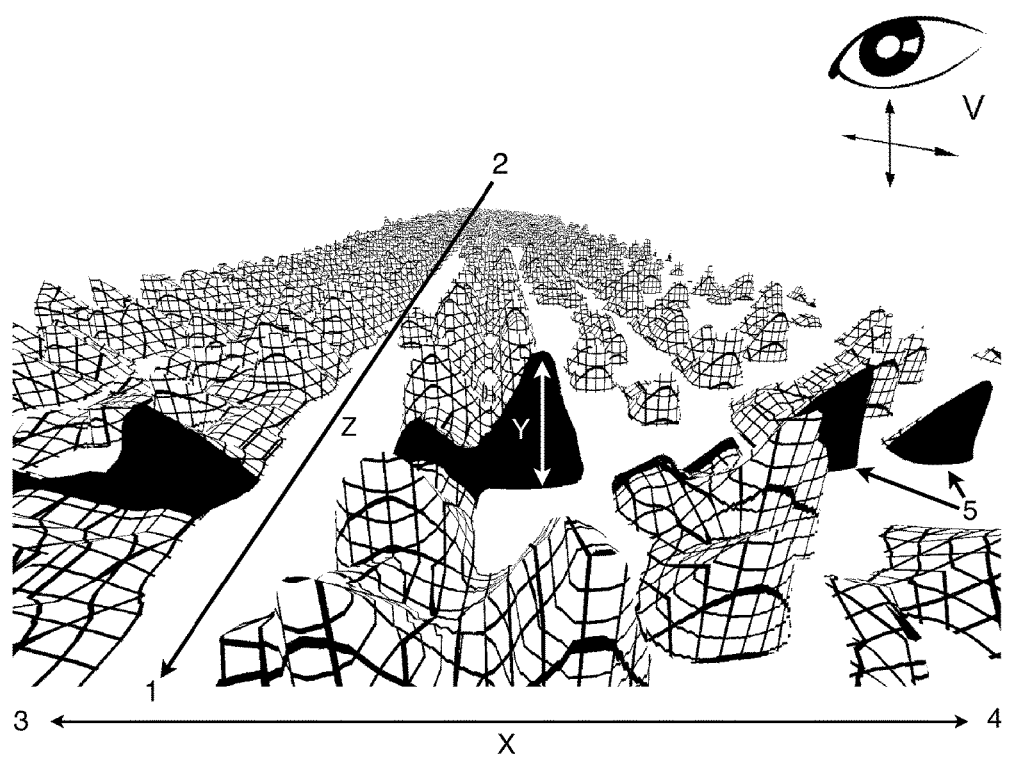

FIG. 9. This diagram shows a second view of the wireframe from the front angle. The temporal plane of playback is shown as the black contoured areas. The Eye represents the ability to view the wireframe at any angle or zoom level.

Figure 10:
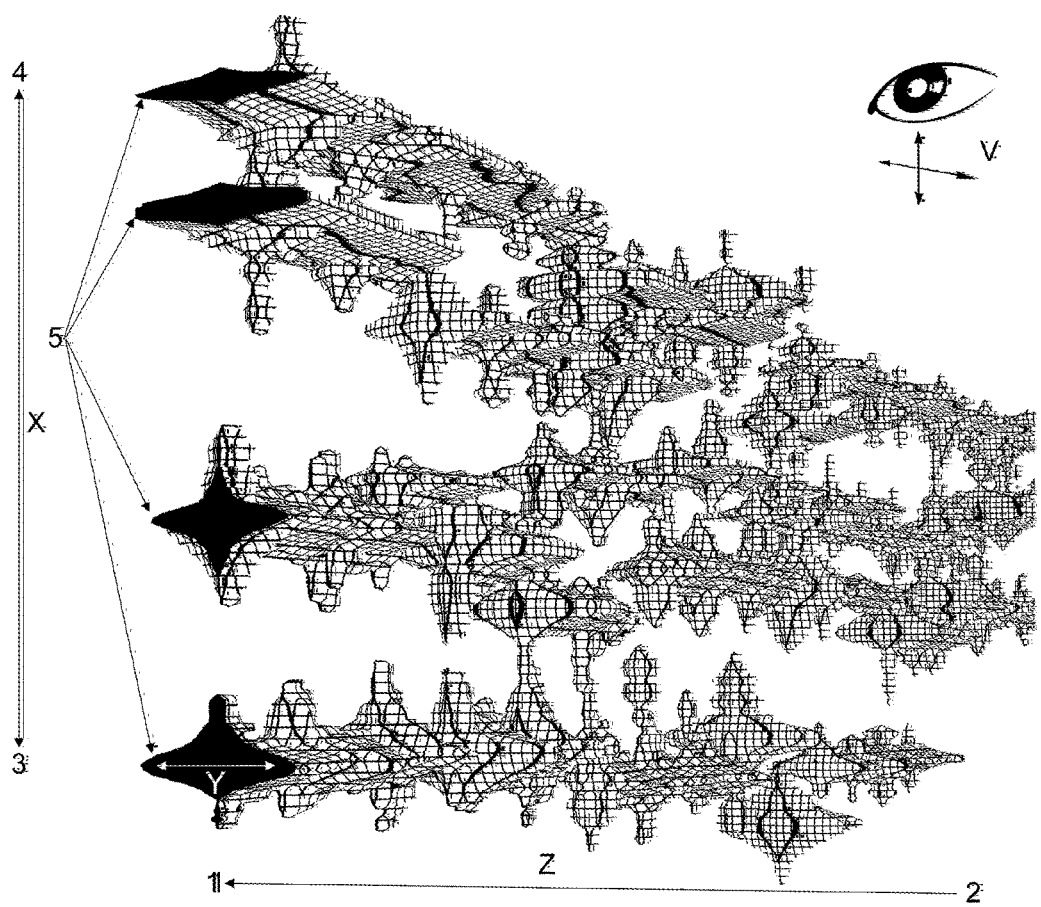

FIG. 10. In this diagram a wireframe is displayed as a symmetrical vertical lattice. A black cross section marks the temporal plane of playback. Eye represents the ability to view the wireframe at any angle or zoom level.

Figure 11:
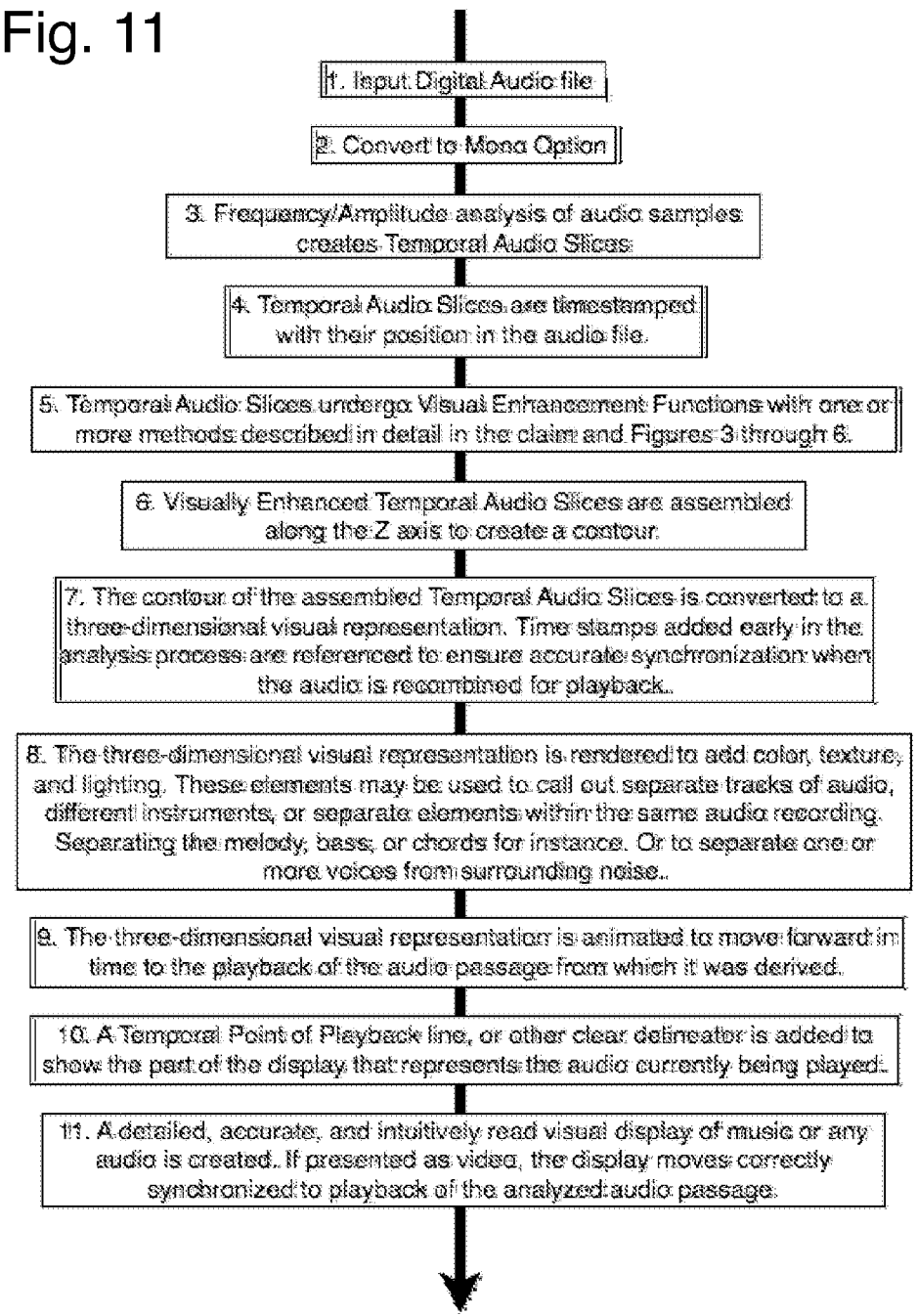

FIG. 11. Flowchart of steps to build the final enhanced three-dimensional display from a digital audio file.

DETAILED DESCRIPTION

The drawing figures and the following description relate to preferred embodiments of the present invention by way of illustration only. It should be noted that from the following discussion, alternative embodiments of the methods and systems disclosed herein will be readily recognized as viable options that may be employed without departing from the principles of the claimed invention. Likewise, the figures depict embodiments of the present invention for purposes of illustration only. One skilled in the art will readily recognize from the following description that alternative embodiments of the methods and systems illustrated herein may be employed without departing from the principles of the invention described herein.

Several methods are combined to create a more detailed, accurate, and intuitively read, three-dimensional visual display of music or any digital audio file. The display is based on the frequency and amplitude content of the audio represented over time. It uses a variety of visual enhancement techniques to reveal the most important aspects of the audio from the surrounding noise or harmonics. If presented as video, the display adds a temporal plane of playback that clearly demonstrates the moving picture is correctly synchronized to playback of the analyzed audio passage.

The proposed method solves several previous problems detailed above to produce a much more intuitive and objectively accurate, moving or still display.

Visual Enhancement Functions are used to manipulate the analyzed data to best show fundamental frequencies commonly known as "the notes" in music notation. The proposed method can also reveal important or desired sounds in more general audio recordings by minimizing undesirable elements. It also shows how to display overtones, inharmonics, and distortion in an audio file without those elements obscuring more fundamental parts.

The proposed method demonstrates the visual display is moving correctly synchronized to the audio playback. It illustrates two display methods for the "temporal plane of playback" that clearly demonstrate the three-dimensional contours are created by the audio and correspondingly move accurately synchronized to the audio playback.

The present invention will be best understood by initially referring to the high-level diagram of FIGS. 1 through 11.

FIG. 1 shows how frequency curves used in this process are created using standard techniques. By plotting on an X/Y graph with the horizontal X axis showing frequency in Hertz and the vertical Y axis showing amplitude in Decibels, a detailed curve is created. The resulting graph is similar to frequency curves representing the frequency response of speakers, microphones, and other audio products. However in this case, the curve only represents a single temporal time slice among hundreds of thousands created from the overall audio passage being analyzed. In FIG. 1, callout A points to Decibel markers measuring amplitude along the vertical Y axis. Callout F points to Hertz markers measuring frequency along the horizontal X axis. While this method can very effectively display stereo and surround recording formats, the following examples are based on the audio being converted to a single monophonic channel to keep the illustrations simpler.

FIG. 2 illustrates a single, unmodified temporal audio slice derived from the method shown in FIG. 1. A Timestamp listing its exact position in the analyzed audio passage has been added on bottom right. Callout A points to the timestamp information which will help ensure accurate synchronization with the audio playback in moving video displays. Callout X represents the frequency axis with bass on the left and treble on the right. Callout Y represents the amplitude axis.

With the timestamp addition, the temporal audio slice is ready for Visual Enhancement Functions to clearly show "the notes" used in musical notation or other fundamental sound elements.

FIGS. 3 through 6 show four variations of Visual Enhancement Functions, more specifically implemented by signal processing functions such as filtering, equalization, Fourier transformation, Hartley transformation, spectral decomposition, attenuation, and visual distortion. Visual enhancement functions may be applied in the audio and/or graphic domains. In all of these diagrams Callout Y represents the amplitude axis. Callout A points to the timestamp information. Callout X represents the frequency axis with bass on the left and treble on the right except in FIG. 6 where the axis representing frequency is reversed.

One of these methods involves simplifying by removing higher overtones and inharmonic frequencies to allow the fundamentals (the lower frequencies we write as musical notes) to be seen more clearly. This is shown in FIG. 3. A single bass note is displayed by removing all upper harmonics and higher fundamentals. This would allow the bass note to be portrayed in a separate color, texture, or other differentiator than other parts in the final display.

Stretching lower frequencies helps focus the viewer on the fundamentals that show the pitch movement of notes more clearly. This is illustrated in FIG. 4. In this visual enhancement function, the upper harmonics have been visually skewed, or narrowed along the horizontal X axis to focus the viewer on the fundamental frequencies. In many music passages, up to two-thirds of the analysis may show frequencies the viewer will not regard as musically significant. By visually compressing along the horizontal X axis, very high frequencies such as cymbals may be represented without taking too much visual space in the overall presentation.

For instance, the highest note on an acoustic piano is the frequency 4186 Hertz. The highest notes of the human voice and most instruments are much lower than 4000 Hertz. Yet most digital audio recordings have frequencies extending to as high as 22,050 Hertz. The majority of the frequencies displayed above 4000 Hertz (as well as many overtones that fall below 4000 Hertz) are not perceived as significant in music notation or in spoken conversation. Those higher frequencies add treble or brightness to the character of the sound, but they are not perceived as "the notes" of music. Those frequencies are above the range of human speech and many other important sounds. To clearly see the most significant information in the audio file, these higher frequencies must be minimized using a variety of functions. These functions include, but are not limited to, filtering, equalization, Fourier transformation, Hartley transformation, spectral decomposition, attenuation, and visual skewing.

Percussive instruments, noise, and distortion add thousands of spikes of inharmonics and overtones that often obscure the underlying fundamentals we know as the notes in music. Manipulating the data that produces those spikes so that they remain a part of the display without obscuring the more fundamental elements is vital to producing an image of the underlying fundamental frequencies to produce a display that can be intuitively read. Similarly, in non-music audio, distortion, hum, background noise, etc. obscure underlying elements that can similarly be revealed by data manipulation and enhancement.

FIGS. 5 and 6 illustrate other methods of bringing out notes and other fundamental sounds in a digital audio file. In the visual enhancement used in FIG. 5, the upper harmonics have been attenuated, and fundamental frequencies showing musical notes have been boosted. With this visual enhancement function, the five notes in a chord are clearly visible, while still allowing the other frequencies to be displayed at a lower level. FIG. 6 is a horizontal flip or inversion (along the X axis) of FIG. 5. This allows a view of the final three-dimensional rendering that corresponds directly to music notation when viewed from certain angles. This view is often most intuitive for musicians who read traditional music notation.

FIG. 7 illustrates nine temporal audio slices using the visual enhancement function detailed in FIG. 5 with timestamps ordered sequentially. The beginning slices are displayed at the front with later slices ordered behind along the Z axis (callout Z with arrow) representing time in the final display. This stack produces a contour representing the frequency and amplitude changes in the analyzed audio passage. Notice slight variations in these nine temporal audio slices as the musical passage analyzed changes over time. The three-dimensional contour created is next converted to a wireframe.

The visual enhancement functions and other steps above can be employed to create a still or moving display. The following descriptions apply more specifically to the creation of moving three-dimensional displays of audio.

FIG. 8 shows a wireframe diagram from an orthogonal view with the temporal plane of playback represented as a contoured thick black line (callout P with arrows). This line highlights the portion of the wireframe that represent the audio currently playing. For the purpose of illustration only, a rectangular slab is added below the plane in FIG. 8 to demonstrate the entire wireframe is moving forward along the Z plane so upcoming audio can be observed and anticipated as it approaches the vertical temporal plane of playback. The visual effect to the viewer is of the entire topography moving forward, across the temporal plane of playback. Callout X represents the frequency axis. Callout Z is positioned along the time axis. The Z callout's arrow shows this forward direction of movement. Early audio is near callout A. Later audio is behind, near callout B.

The direction of the display's movement is very important. Earlier audio is presented in front of upcoming audio that moves forward from the rear. Because upcoming audio is displayed in the background the viewer can anticipate upcoming portions of the audio. This direction is naturally intuitive because we are drivers and descendants of hunters. Humans move toward what we are observing, not away.

Upcoming audio is displayed in the background that allows the viewer to anticipate upcoming portions of the audio.

Displaying upcoming audio is vital to allow decision making in practical applications.

This display method can be used for much more than passive observation. By showing the upcoming audio it allows users to make decisions based on upcoming material. Musicians, conductors, audio engineers, and DJs often must look ahead in music or audio files to anticipate upcoming events.

In a first embodiment of the method we can show musicians, DJs, audio engineers or other music and audio professionals the actual amplitude and frequency contours of musical notes. These musicians and engineers need the capability to look ahead in this new type of musical "score." The proposed method shows the full context of the audio, just like music does. It shows the upcoming audio, the temporal plane of playback and if desired a portion of audio that has already played.

In a second embodiment of the method, electronic garners need to see upcoming terrain to make decisions about their next course of action. To fly a plane or drive a car, you can't be restricted to only looking backwards. With audio rendered into full topographies, it may be possible for viewers to "fly" over any sections of the audio they wish to observe from any angle they choose. But they have to see forward to move to new, upcoming parts.

With this method the viewer sees what's coming up and the overall context of the audio over time. It enables this display for use as a game, visual mixing aid, or an alternative type of music notation. Even for passive viewing, it's just a better direction for observing moving objects.

FIGS. 8 and 9 show the temporal plane of playback displayed clearly and prominently to intuitively illustrate the sound running correctly synchronized to the picture. Without this plane of playback added, even if a detailed moving three-dimensional picture is displayed with playback of the analyzed audio, the actual point of synchronization with the analyzed audio is not clear. We do not see the point that our ears are hearing. The proposed method clearly shows this temporal plane of playback.

FIG. 9 shows a second angle of the wireframe from the front (callout 1) with upcoming portions of the audio passage further back (callout 2). From this angle, bass frequencies are displayed on the left (callout 3) and treble on the right (callout 4). The temporal plane of playback is represented here as a black contoured line (callout 5 with arrows points to the right portion of this line). The eye icon with bidirectional arrows below it (callout V) represents the ability to show the wireframe display from any angle or zoom level. Callout X with arrow represents the frequency axis, callout Y with arrow represents the amplitude axis, and callout Z is positioned along the time axis with an arrow showing the direction of movement.

A variation of the topographic type display shown in FIGS. 8 and 9 is to remove the low flat plane that represents only silence. With the plane representing silence removed, the notes or other significant sound elements appear as individual shapes rather than as a part of a continuous topography. If this masked topography with silence stripped away is mirrored, the result is a symmetrical lattice that allows the viewing of notes or other important audio elements from either side of a three-dimensional display. This method of showing notes or other important audio elements as separate shapes in a display rather than a continuous plane is more flexible and allows a more comprehensive and visually rich presentation.

A lattice raised to the vertical position with the treble notes and high harmonics on the top, when viewed from the side reads very much like a musical score. However, this display shows the exact duration, point of attack, amplitude contour, and if desired the harmonic spectrum of each note. These musical parameters are not represented accurately or even not at all in traditional music notation.

FIG. 10 shows a wireframe of piano notes displayed as a symmetrical vertical lattice. In this figure, earlier notes in the passage are shown on the left side (callout 1) with upcoming portions on the right (callout 2). The time axis (callout Z) is shown with an arrow indicating the direction of movement. Bass notes are shown on the bottom (callout 3) and treble notes on the top (callout 4). The temporal plane of playback is represented as a black cross section. At this moment in the music, it is intersecting four notes resulting in four black intersections with said notes (callout 5 with arrows). The eye icon with bidirectional arrows (callout V) represents the ability to show the wireframe display from any angle or zoom level. The frequency axis (callout X with arrow) is vertical. The amplitude axis (callout Y in white with arrow) is horizontal and is shown on the lowest note on the left side.

FIG. 10's method of displaying the temporal plane of playback by cross sectioning the audio contours with a negative Boolean plane has the advantage of removing the contours of earlier audio in front that has already played, revealing the plane of playback and upcoming audio unobstructed. It has the additional property of undulating with the amplitude of the contours, so there is a direct visual correlation with the volume levels.

To create an even more detailed visual display of the audio, significant elements of a general sound or musical recording may be depicted with separate color, texture, lighting/shading or positional renderings within the display. Portraying different instruments or important sound elements on separate planes of playback simultaneously can allow a more detailed and useful display. A musical recording showing separate instruments, or important musical passages within a single instrument can produce a much more meaningful and intuitive display.

A view of multiple tracks displayed together in a horizontal topography will enable audio engineers to see an audio mix by frequency, allowing more precise volume and equalization adjustments between tracks. Likewise, with a general sound recording, different elements of the sound depicted separately will provide a much deeper insight into the overall soundscape.

A multitrack display with different instruments colored or textured separately, used in a vertical lattice can create a very detailed alternative to a conductor's master score and could have great use in music performance as well as to visually map audio for complex mixing and mastering sessions. It could be very valuable in post-production for film where hundreds of audio tracks are often used.

The addition of a Timestamp on each temporal audio slice early in the audio analysis process ensures it will be displayed correctly synchronized to the playback of the audio from which it is derived.

FIG. 11 is a Summary Flowchart that recaps the key steps to build an intuitive three-dimensional display from a digital audio file, visually enhance the analysis, and to clearly demonstrate the moving display is playing accurately synchronized to the analyzed audio from which it is derived.

In view of the above teaching, a person skilled in the art will recognize that the invention can be embodied in many different ways in addition to those described without departing from the spirit of the invention. Therefore, the scope of the invention should be judged in view of the appended claims and their legal equivalents.

I claim:

1. A method for generating a three-dimensional visual representation of one or more digital audio files on a display including a time domain temporal aspect and a frequency domain with a temporal plane of playback that during audio video playback highlights the point in the image that corresponds to the audio that is currently playing as the image of the audio dynamically moves across said plane, three-dimensional images resulting from frequency analysis and enhancement processes are committed and stored for reproduction in a non-transitory medium:
   a) receiving a digital audio file comprising tones;
   b) decomposing said digital audio file in the temporal domain to produce and sequentially store temporal audio slices for frequency analysis;
   c) generating timestamps for marking locations of said temporal audio slices in said digital audio file along a time axis;
   d) analyzing said temporal audio slices in the frequency domain to produce audio frequency spectra of said temporal audio slices with frequency being shown along a frequency axis and amplitude being shown along an amplitude axis;
   e) applying at least one visual enhancement function to said audio frequency spectra to produce visually enhanced audio frequency spectra;
   f) organizing said temporal audio slices with said visually enhanced audio frequency spectra along said time axis based on said timestamps and stored sequentially to generate said three-dimensional visual representation of said digital audio file for later playback synchronized with said audio file;
   g) displaying said three-dimensional visual representation from a predetermined viewpoint to a user while said digital audio file is being played back;
   h) scrolling a visual playback indicator at a temporal plane of playback of said digital audio file along said time axis and over said three-dimensional visual representation; wherein said three-dimensional visual representation is initially displayed in an orientation where said visual representation moves from the background forward across the temporal plane of playback.

2. The method of claim 1, wherein said step of applying said at least one visual enhancement function comprises applying said at least one visual enhancement function to at least one component of said spectra.

3. The method of claim 2, wherein said at least one visual enhancement function is related to at least one signal processing function.

4. The method of claim 3, wherein said at least one signal processing function is selected from the group of functions consisting of visual distortion and skewing as well as audio signal processes including filtering, equalization, Fourier transformation, Hartley transformation, spectral decomposition, and attenuation.

5. The method of claim 2, further comprising identifying said at least one component of said spectra with a source of at least one of said tones.

6. The method of claim 5, wherein said at least one visual enhancement function is applied to at least one component of said spectra identified with said source.

7. The method of claim 1 uses a computer to generate a three-dimensional image of said audio with process instructions and the resulting image stored in memory.

8. The method of claim 1, further comprising the step of changing said predetermined viewpoint.

9. The method of claim 8, wherein said step of changing said predetermined viewpoint is controlled by said user.

10. The method of claim 8, wherein said step of changing of said predetermined viewpoint comprises any change selected from three-dimensional translations and three-dimensional rotations of said predetermined viewpoint.

11. The method of claim 1, further comprising the step of altering at least one imaging characteristic of said three-dimensional visual representation from said predetermined viewpoint.

12. The method of claim 11, wherein said at least one imaging characteristic comprises zooming.

13. The method of claim 1, wherein said at least one visual enhancement function comprises the use of color.

14. The method of claim 1, wherein said at least one visual enhancement function comprises the use of texture.

15. The method of claim 1, wherein said at least one visual enhancement function comprises the use of lighting or shading.

16. The method of claim 1, wherein upcoming audio which is about to play can be displayed, allowing viewers; including musicians, garners, artists, engineers, and others, to anticipate and react to events about to occur.

* * * * *